United States Patent
Kellock et al.

(10) Patent No.: US 10,617,215 B2
(45) Date of Patent: Apr. 14, 2020

(54) TRAVEL SUPPORT STRUCTURE

(71) Applicant: Coolside Limited, East Kilbride (GB)

(72) Inventors: David Kellock, East Kilbride (GB); Michael Corrigan, East Kilbride (GB)

(73) Assignee: Coolside Limited, East Kilbride (GB)

( * ) Notice: Subject to any disclaimer, the term of this patent is extended or adjusted under 35 U.S.C. 154(b) by 212 days.

(21) Appl. No.: 14/405,115

(22) PCT Filed: May 30, 2013

(86) PCT No.: PCT/GB2013/000246
§ 371 (c)(1),
(2) Date: Dec. 2, 2014

(87) PCT Pub. No.: WO2013/178979
PCT Pub. Date: Dec. 5, 2013

(65) Prior Publication Data
US 2015/0157130 A1    Jun. 11, 2015

(30) Foreign Application Priority Data

Jun. 2, 2012 (GB) .................................. 1209898.4
Jun. 28, 2012 (GB) .................................. 1211489.8
May 1, 2013 (GB) .................................. 1307905.8

(51) Int. Cl.
*A47C 7/36* (2006.01)
*A47C 7/38* (2006.01)
*B60N 2/80* (2018.01)

(52) U.S. Cl.
CPC ................ *A47C 7/38* (2013.01); *A47C 7/383* (2013.01); *B60N 2/80* (2018.02)

(58) Field of Classification Search
CPC .................................... A47C 7/36; A47C 7/38
USPC ..................... 5/636, 630, 640, 643
See application file for complete search history.

(56) References Cited

U.S. PATENT DOCUMENTS

| 3,776,224 | A |   | 12/1973 | McFarland |              |
|-----------|---|---|---------|-----------|--------------|
| 4,034,747 | A | * | 7/1977  | Leroy     | A61F 5/03    |
|           |   |   |         |           | 128/DIG. 23  |
| 4,854,306 | A | * | 8/1989  | Pujals, Jr. | A61F 5/055 |
|           |   |   |         |           | 128/DIG. 23  |

(Continued)

FOREIGN PATENT DOCUMENTS

| GB | 2049436   |   | 12/1980 |
|----|-----------|---|---------|
| GB | 2366181 A |   | 3/2002  |

(Continued)

OTHER PUBLICATIONS

"International Application No. PCT/GB2013/000246, International Search Report and Written Opinion dated Sep. 16, 2013", (Sep. 16, 2013), 10 pgs.

(Continued)

*Primary Examiner* — Fredrick C Conley
(74) *Attorney, Agent, or Firm* — Schwegman Lundberg & Woessner, P.A.

(57) ABSTRACT

A support structure for at least partially supporting a user's head is described. The support structure comprises a frame having a head engaging portion and a shoulder engaging portion, the shoulder engaging portion adapted to spread the load of the user's head over a user's shoulder, the frame being shaped to the contour of the user's body from the head engaging portion to the shoulder engaging portion.

26 Claims, 6 Drawing Sheets

(56) References Cited

U.S. PATENT DOCUMENTS

| | | | |
|---|---|---|---|
| 5,205,813 A | 4/1993 | Schmidt | |
| 5,220,700 A * | 6/1993 | Liu | A47C 7/383 2/205 |
| 5,722,939 A | 3/1998 | Hohlen | |
| 6,289,538 B1 | 9/2001 | Fidge | |
| 6,447,468 B1 | 9/2002 | Hankins et al. | |
| 8,898,840 B1 * | 12/2014 | Majette | A47C 7/383 297/393 |
| 10,098,464 B2 | 10/2018 | Kellock et al. | |
| 2004/0204666 A1 | 10/2004 | Marsh | |
| 2005/0113728 A1 * | 5/2005 | Heinz | A61F 5/055 602/18 |
| 2011/0169316 A1 | 7/2011 | Goei et al. | |
| 2016/0220410 A1 | 8/2016 | Hwang | |
| 2018/0028091 A1 | 2/2018 | Huang | |
| 2018/0103764 A1 | 4/2018 | Kellock et al. | |
| 2019/0298067 A1 | 10/2019 | Kellock et al. | |

FOREIGN PATENT DOCUMENTS

| | | |
|---|---|---|
| WO | WO-2005/039441 | 5/2005 |
| WO | WO-2013/178979 | 12/2013 |
| WO | WO-2013/178979 A1 | 12/2013 |

OTHER PUBLICATIONS

"European Application Ser. No. 13736935,1, Office Action dated Jan. 16, 2015", 2 pgs.

"European Application Ser. No. 13736935.1, Office Action dated Aug. 12, 2016", 4 pgs.

"European Application Ser. No. 13736935.1, Response filed Jul. 22, 2015 to Office Action dated Jan. 16, 2015", 12 pgs.

Australian Application No. 2013269365, Patent Examination Report No. 1 dated Sep. 16, 2016, 3 pgs.

European Application No. 13736935.1, Communication Pursuant to Article 94(3) EPC dated Aug. 12, 2016, 22 pgs.

"Chinese Application Serial No. 201380029142.4, Office Action dated Apr. 24, 2017", w/English Translation, 31 pgs.

"U.S. Appl. No. 15/843,890, Non Final Office Action dated Jan. 25, 2018", 11 pgs.

U.S. Appl. No. 15/843,890, Response to Non Final Office Action dated Jan. 25, 2018 filed Apr. 5, 2018, 10 pgs.

Japanese Application No. 2015-514571, Notification of Reasons for Refusal dated Jan. 23, 2018, (with English machine translation from Global Dossier system), 6 pgs.

U.S. Appl. No. 15/843,890, Final Office Action dated Jul. 12, 2018, 11 pgs.

U.S. Appl. No. 15/843,890, Notice of Allowance dated Sep. 6, 2018, 5 pgs.

U.S. Appl. No. 15/843,890, Response filed Aug. 14, 2018 to Final Office Action dated Jul. 12, 2018, 5 pgs.

U.S. Appl. No. 16/284,951, Response filed May 30, 2019 to Non Final Office Action dated Apr. 16, 2019, 8 pgs.

PCT/GB2018/052362, International Search Report and Written Opinion dated Oct. 23, 2018, 12 pgs.

UAE Application Serial No. 1327/2014, Korean Examination Report, in English, 9 pgs.

UAE Application Serial No. 1327/2014, Korean Search Report, 5 pgs.

UK Application Serial No. GB1813516.0, Combined Search and Examination Report under Sections 17 and 18(3) dated Feb. 19, 2019, 5 pgs.

U.S. Appl. No. 16/284,951, Notice of Allowance dated Aug. 14, 2019, 6 pgs.

"U.S. Appl. No. 16/284,951, Notice of Allowability dated Oct. 25, 2019", 2 pgs.

* cited by examiner

TRAVEL SUPPORT STRUCTURE

PRIORITY CLAIM TO RELATED APPLICATIONS

This application is a U.S. National Stage application filed under 35 U.S.C. § 371 from International Application Serial No. PCT/GB2013/000246, which was filed May 30, 2013, and published as WO 2013/178979 on Dec. 5, 2013, and which claims priority to United Kingdom Application No. GB 1209898.4, filed Jun. 2, 2012, and to United Kingdom Application No. GB 1211489.8, filed Jun. 28, 2012, and to United Kingdom Application No. GB 1307905.8, filed May 1, 2013, which applications and publication are incorporated by reference as if reproduced herein and made a part hereof in their entirety, and the benefit of priority of each of which is claimed herein.

FIELD OF THE INVENTION

The present invention relates to a support structure for at least partially supporting a user's head when travelling. Particularly, the support structure is to at least partially support a user's head when sleeping whilst sitting in a relatively upright position.

BACKGROUND TO THE INVENTION

The use of travel pillows is common practice for passengers in cars, planes, buses and trains. There are four main types of travel pillow, currently on the market: memory foam pillows, polystyrene bead filled pillows, air filled pillows and feather or stuffing filled pillows.

These pillows come in various forms, but generally fall into one of three categories: C-shaped, O-shaped, or L shaped.

The pillows currently on the market are generally aesthetically unpleasant and have further drawbacks. For example, the U-shaped pillows generally do not support a user's head at the front below the chin, or at the sides, which causes the chin to fall forward and the neck to lie at an awkward angle, the O-shaped pillows do not cater for a wide enough range of different neck sizes the air filled pillows can be difficult to inflate and to plug shut and the stuffed pillows are so poor they don't even provide any support. The bead-filled pillows are better, as they can be quite firm, but also lack support in the upright position at the front of the neck. Furthermore, the conventional neck pillows can move in use, particularly away from the desired area of contact with the user, to be less supportive.

SUMMARY OF THE INVENTION

According to a first aspect of the present invention there is provided a support structure for at least partially supporting a users head, the support structure comprising:

a frame having a head engaging portion and a shoulder engaging portion, the shoulder engaging portion adapted to spread the load of the user's head over a user's shoulder, the frame being shaped to the contour of the user's body from the head engaging portion to the shoulder engaging portion.

In at least one embodiment of the present invention, a support structure having a frame which follows the contours of the user's body, provides a support structure which is unobtrusive and can be concealed by a scarf, for example.

The frame may be of substantially constant thickness.

The frame may have first surface and a second surface.

The first surface may be substantially convex.

The second surface may be substantially concave.

The first surface may, directly or indirectly, be a user engaging surface.

The head engaging portion and the shoulder engaging portion may define the first surface.

The first surface and the second surface may be substantially parallel.

The frame may define a continuous surface.

The frame may be a sheet.

The frame may be a flexible sheet.

The frame may be resilient.

The head engaging portion and the shoulder engaging portion may be hingedly connected. Such an arrangement permits flat packing of the product.

The head engaging portion may be substantially flat

Alternatively or additionally, the head engaging portion may comprise a first limb and a second limb.

The first head engaging portion limb and the second head engaging portion limb may be connected by a head engaging portion connecting member.

The head engaging portion connecting member may connect the limb at a location distal from an end of each head engaging portion limb. Such an arrangement permits the limbs to extend away from the connecting member making the device comfortable for users of different neck lengths.

The shoulder engaging portion may comprise a first shoulder engaging portion limb and a second shoulder engaging portion limb, the first and second shoulder engaging portion limbs extending from the head engaging portion.

The first shoulder engaging portion limb and the second shoulder engaging portion limb may be connected by a shoulder engaging portion connecting member.

The shoulder engaging portion first and second limbs may be adapted to straddle a user shoulder. In this embodiment, one shoulder engaging portion limb extends, in use, down the front of a user's shoulder and the other shoulder engaging portion limb extends down the back of the user's shoulder.

The shoulder engaging portion connecting member may connect the limb at a location distal from an end of each shoulder engaging portion limb. Such an arrangement permits the limbs to extend away from the connecting member making the device comfortable for users of different neck lengths.

Where there is a head engaging portion first limb and a head engaging portion second limb, the support structure may further comprise a head engaging portion bridging means connecting the first head engaging portion limb to the second head engaging portion limb. The head engaging portion bridging means is adapted to span the gap between the head engaging portion limbs.

Where there is a shoulder engaging portion first limb and a shoulder engaging portion second limb, the support structure may further comprise a shoulder engaging portion bridging means connecting an end of the first shoulder engaging portion limb to an end of the second shoulder engaging portion limb, the first and second shoulder engaging portion limb ends being distal from the head engaging portion. In this embodiment, the bridging means extends over the shoulder, in use, to distribute the weight of the user's head over a greater area. The shoulder engaging portion bridging means is adapted to span the gap between the shoulder engaging portion limbs.

The support structure may comprise an anchoring means adapted to secure the support structure, in use, to a user.

The anchoring means may be adapted to secure the support structure, in use, to a user's neck. The anchoring means may be adapted to press the support structure against a user's neck.

The anchoring means may define a support structure receiving portion.

The support structure receiving portion may be a pocket.

The anchoring means may comprise a fabric material.

The anchoring means may comprise an elongate length of fabric material. The fabric material may be a scarf.

The support structure receiving portion may be located at a first end of the fixing means.

The head engaging portion bridging means and the shoulder engaging portion bridging means may be defined by the anchoring means.

The head engaging portion bridging means and the shoulder engaging portion bridging means may be defined by the support structure receiving portion.

The bridging means may be a web.

The frame may be adapted, in use, to compress under the weight of a user's head.

Where there is a head engaging portion connecting member and a shoulder engaging connecting member, the connecting members may engage as the frame compresses.

Where the connecting members engage, the connecting members may resist further compression of the frame.

According to a second aspect of the present invention there is provided a method of supporting a user's head, the method comprising the steps of:

engaging a frame having a head engaging portion and a shoulder engaging portion to a user such that the head engaging portion engages the person's head and the shoulder engaging portion engages this user's shoulder and the frame follows the contour of the user's body from the head engaging portion to the shoulder engaging portion and the frame shoulder engaging portion spreads the load of the user's head over the user's shoulder.

BRIEF DESCRIPTION OF THE DRAWINGS

An embodiment of the present invention will now be described with reference to the accompanying Figures in which;

FIG. 6, comprising

DETAILED DESCRIPTION OF THE DRAWINGS

Figure 1:
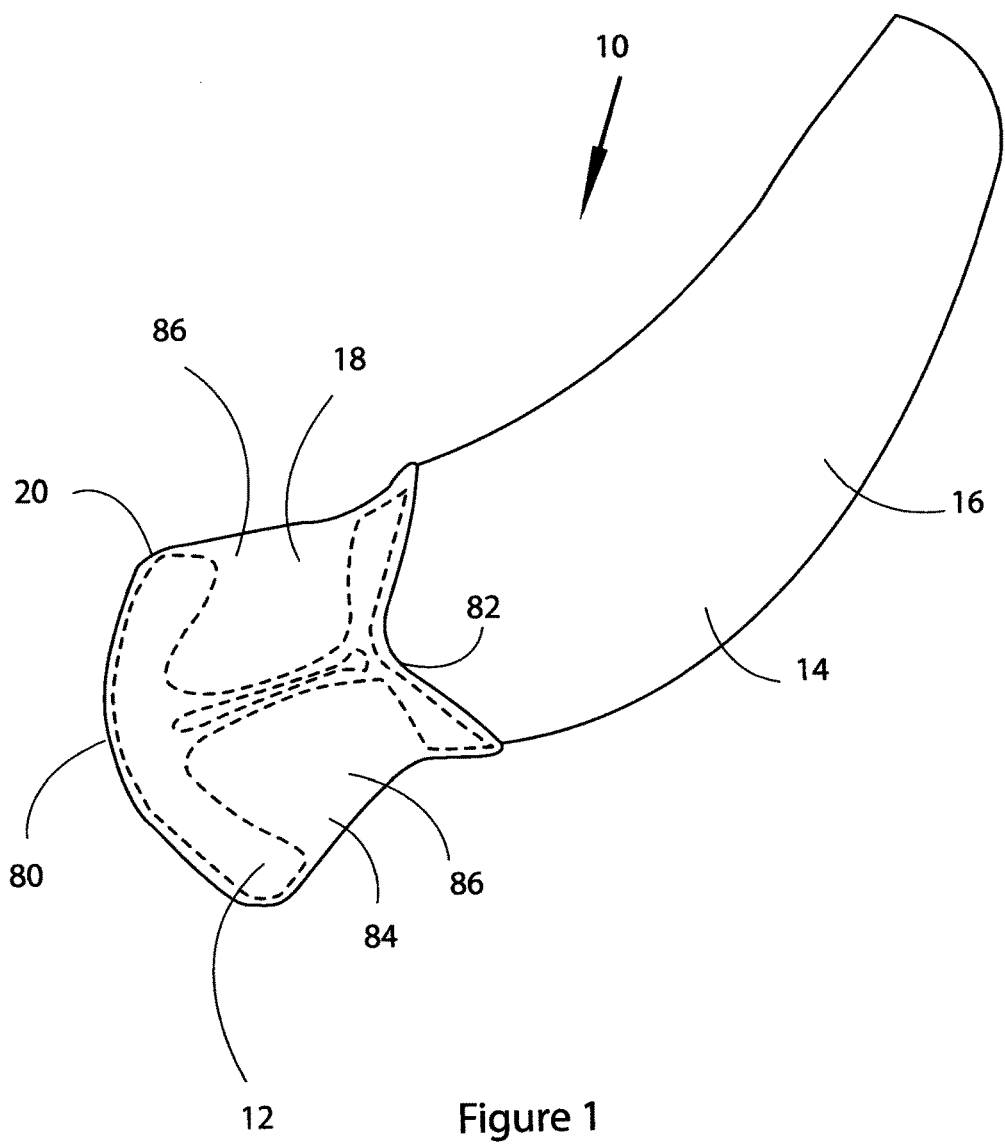
FIG. 1 is a perspective view of a support structure for at least partially supporting a user's head, according to a first embodiment of the present invention.
Figure 2:
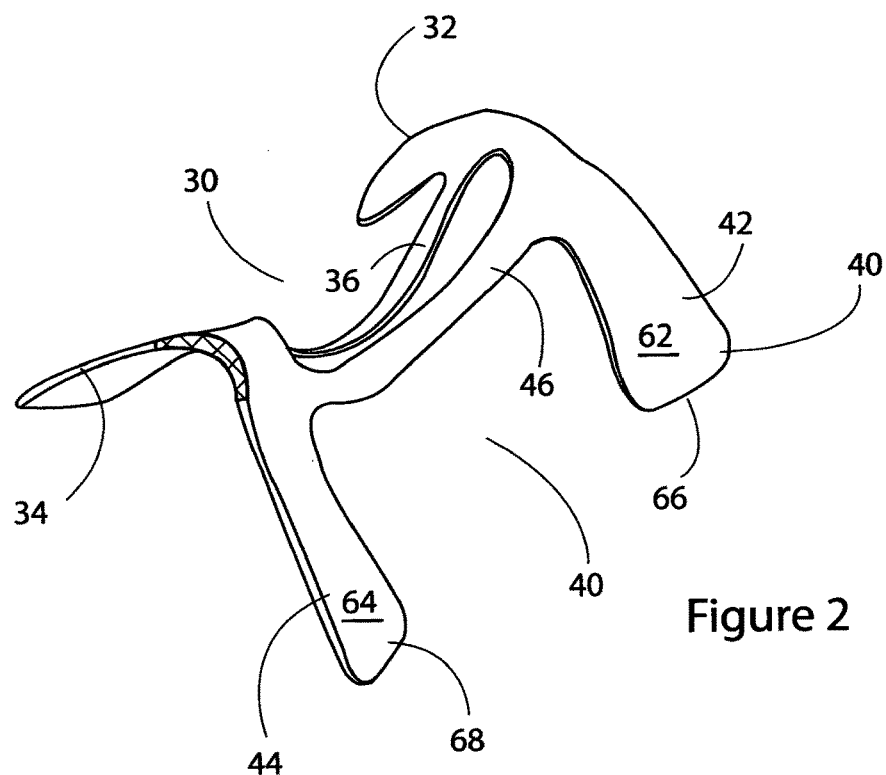
FIG. 2 is a perspective view of part of the support structure frame of FIG. 1.
Figure 3:
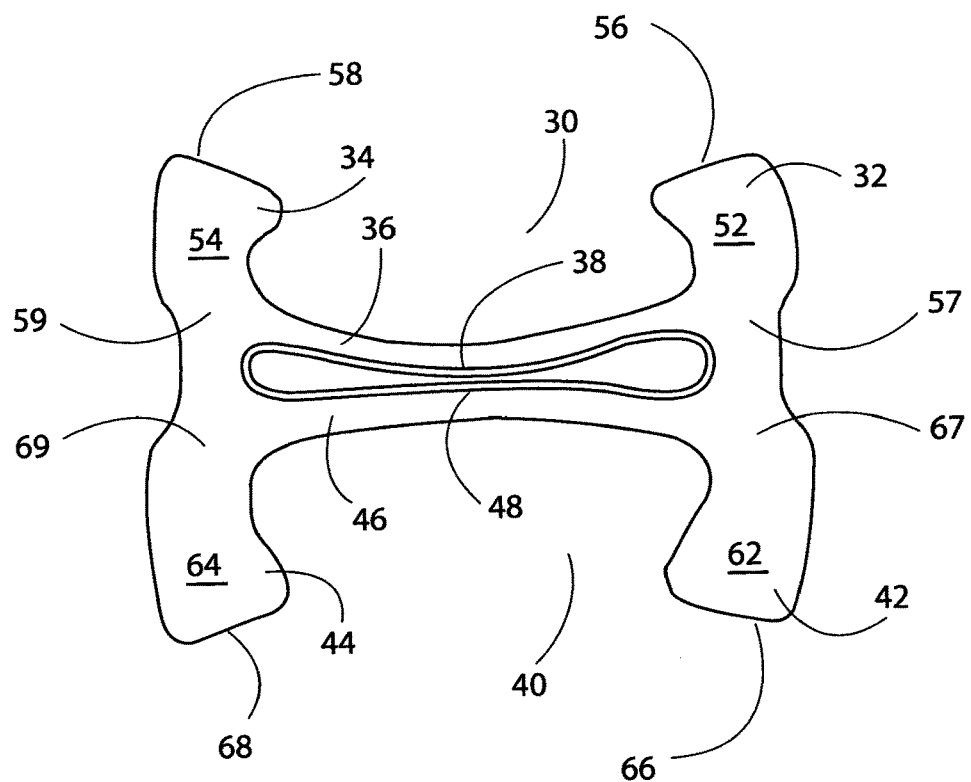
FIG. 3 is a top view of the support structure frame of FIG. 1.
Figure 4:
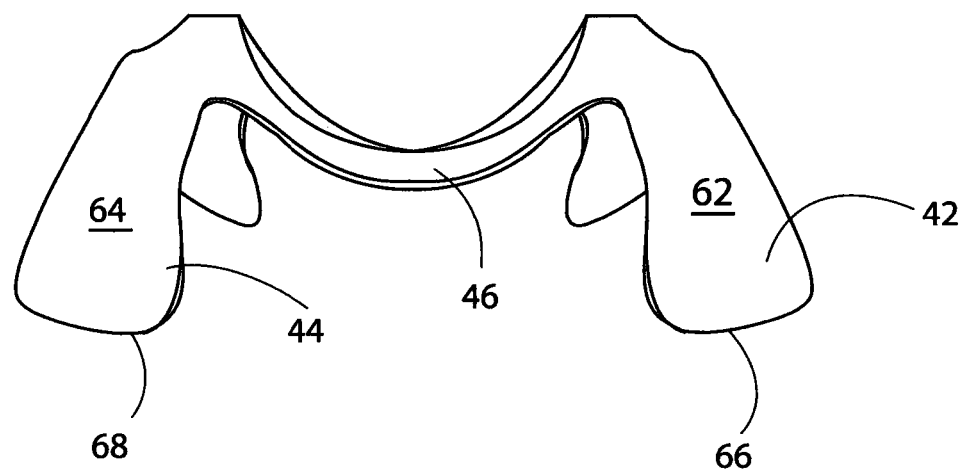
FIG. 4 is a side view of the support structure frame of FIG. 1.
Figure 5:
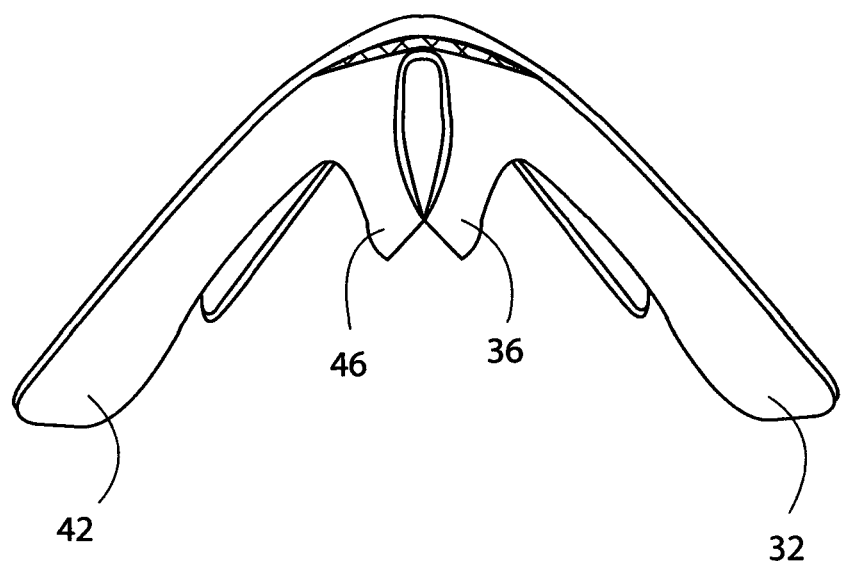
FIG. 5 is an end view of the support structure frame of FIG. 1.

Referring firstly to FIG. 1, a perspective view of a support structure, generally indicated by reference numeral 10 for at least partially supporting a user's head (not shown) according to a first embodiment of the present invention.

The support structure 10 comprises a frame 12 and an anchoring means 14 in the form of a scarf 16. The frame 12 is contained within a pocket 18 located at a first end 20 of the scarf 16.

The frame 12 will now be described in more detail with reference to FIGS. 2, 3, 4 and 5, perspective, top, side and then views of the support structure frame 12 of FIG. 1.

The frame 12 comprises a single piece of resilient polymeric material and defines a head engaging portion 30 and a shoulder engaging portion 40. As will be shown, the shoulder engaging portion 40 is adapted to spread the load of the user's head over a user's shoulder. The frame 12 is shaped to the contour of the user's body from the head engaging portion 30 the shoulder engaging portion 40.

The head engaging portion 30 comprises a first head engaging limb 32 and a second head engaging limb 34, the first and second head engaging limbs 32, 34, being connected by a head engaging portion connecting member 36.

The shoulder engaging portion 40 comprises a first shoulder engaging limb 42 and a second shoulder engaging limb 44, the first and second shoulder engaging limbs 42, 44 being connected by a shoulder engaging portion connecting member 46.

The head engaging portion limbs 32, 34 have respective head engaging surfaces 52, 54 which are angled towards each other to cup, in use, a part of user's jaw. Similarly, the shoulder engaging portion limbs 42, 44 have respective shoulder engaging surfaces 62, 64 which also angled towards each other to cup between them two portions of the convex surface of a user's shoulder when in use.

It will be noted, the limbs 32, 34, 42, 44 are paddle shaped in that they are wider at their free ends, 56, 58, 66, 68 than at their connecting ends 57, 59, 67, 69 where they join their respective connecting members 36, 46

In the embodiment shown in FIG. 2-FIG. 5, the frame 12 is in an uncompressed configuration. That is, the configuration shown on these Figures is a "not in use" configuration, the frame 12 being adapted to be compressed under the weight of the user's head. In this uncompressed configuration, the head engaging portion connecting member 36 and the shoulder engaging portion connecting member 46 are in contact at their respective midpoint's 38, 48. This will be discussed further in due course In use, the frame 12 is fitted into the pocket 18 of the scarf 16. Referring to FIG. 1, the sides of the pocket 80, 82 maintain a substantially constant spacing between the head engaging portion limbs 32, 34 and a substantially constant spacing between the shoulder engaging portion limbs 42, 44. The scarf surface 84 providing a bridging means 86 to provide a comfortable contact surface for the user.

Operation of the support structure 10 will now be described with reference to FIG. 6 comprising FIGS. 6A-6D, a sequential series showing fitting of the support structure 10 to a user 100.

The user 100 places the first end of the scarf 20 containing the frame 12 inside the scarf pocket 18 against their neck 102 such that the frame head engaging portion 30 rests against the underside of the user's jaw 104 and the frame shoulder engaging portion 40 lies across the user's shoulder 106.

The user 100 takes a scarf second end 108 and passes it around their neck 102, until the scarf encircles their neck 102.

The scarf first and second ends 20, 108 are provided with hook and loop fastener portions 110, 112 which are brought together to secure the support structure to the user 100, thereby providing structure 10 adapted to at least partially support the user's head 114 permitting them to sleep comfortably in an upright position.

Figure 6A:
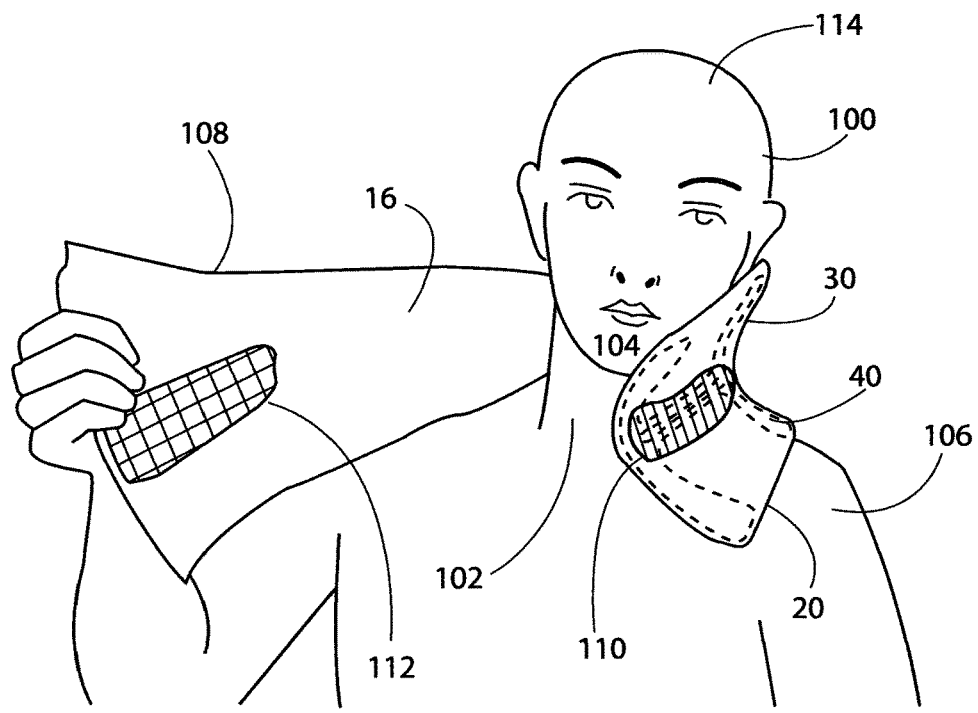
FIGS. 6A to 6D, is a sequential series of views showing support structure of FIG. 1 being used by a user.
Figure 6B:
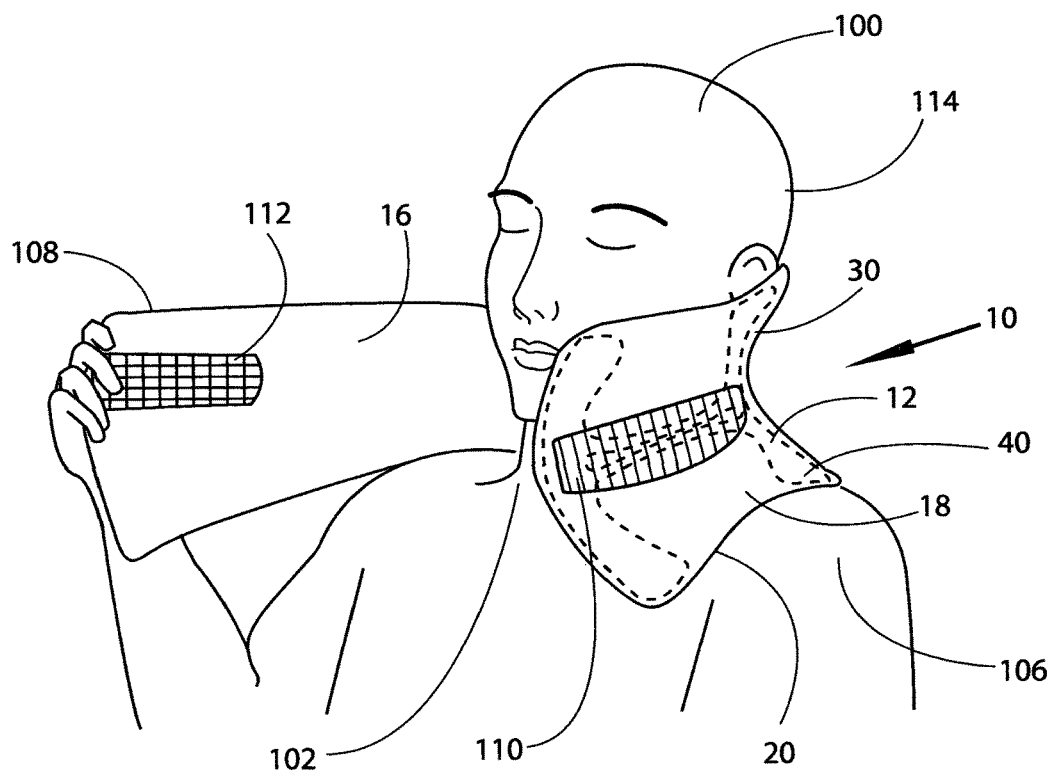
Figure 6C:
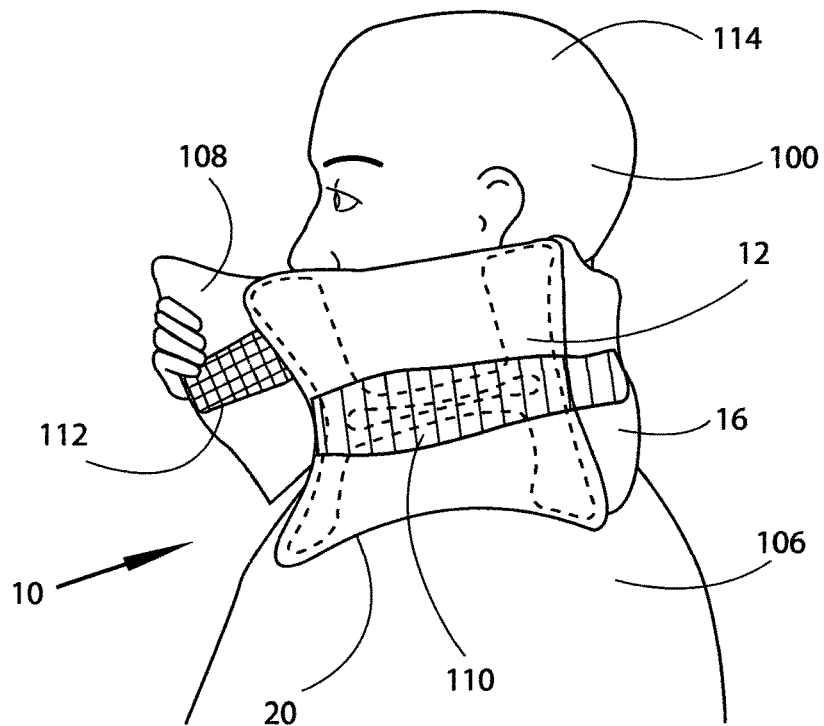
Figure 6D:
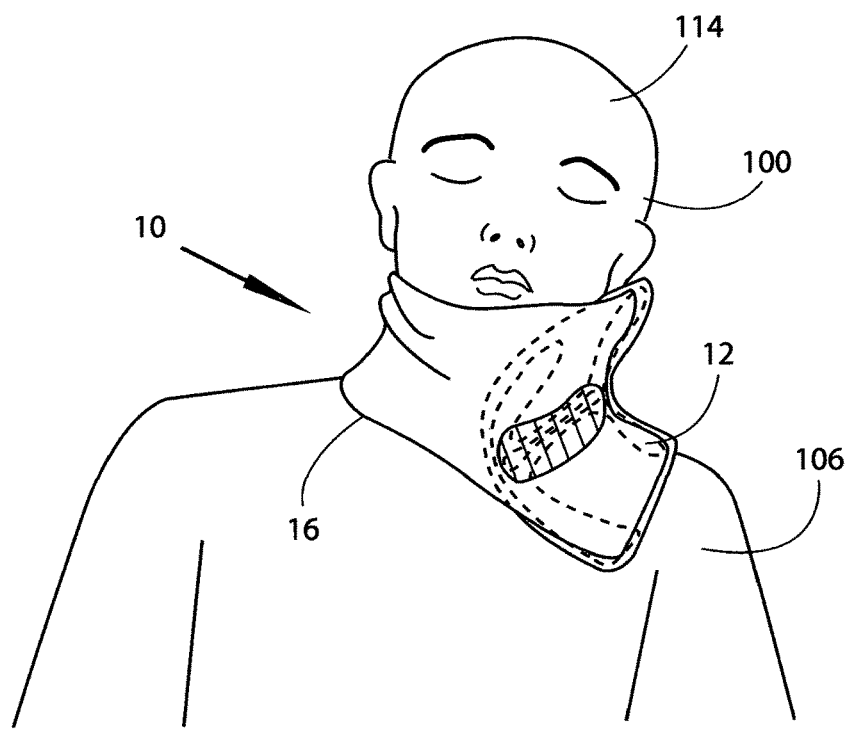
Figure 7:
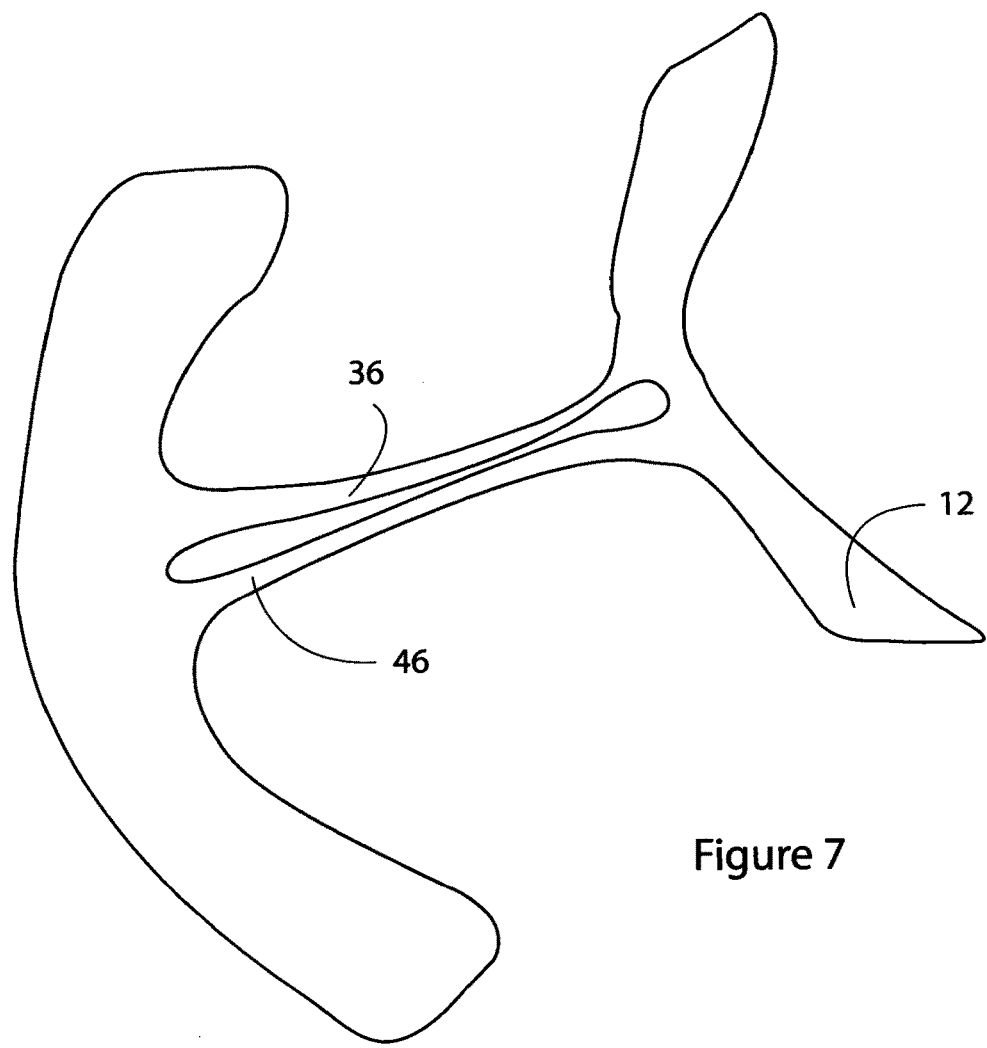
FIG. 7 is a close-up of the support structure frame of FIG. 6B.

Referring to FIG. 7, a close-up of the frame 10 shown in FIG. 6B in which the frame 12 is partially compressed, it will be noted that the head engaging portion connecting member 36 and a shoulder engaging portion connecting member 46 for much of the length of the respective portions. This provides extra rigidity to the support structure 10, allowing for an initial "give" when the user 100 puts the weight of their head 114 on the support structure 10 by providing more resistance as the user applied weight increases and the size of the contact area between the connecting members 36, 46 increases.

Various modifications and improvements may be made to the above described embodiments without departing from the scope of the present invention. For example, the bridging means may include an elasticated strap between the free ends of the limbs.

The invention claimed is:

1. A support structure for at least partially supporting a user's head, the support structure comprising:
    a frame sized to fit within a cover, the frame including:
        a head engaging portion, wherein, when in use, the head engaging portion engages with an underside of the user's jaw and is operable to provide support for tilting of the user's head towards the head engaging portion of the frame; and
        a shoulder engaging portion, wherein the shoulder engaging portion, in use, is operable to engage with a shoulder area and wherein between the head engaging portion and the shoulder engaging portion the frame is shaped to correspond with the contour of the user's neck such that in use, the frame rests against the user's neck and is operable to spread the load of the user's head to the shoulder area,
    wherein the frame is movable between a first, uncompressed configuration, and a second at least partially compressed configuration,
    wherein when moved from the first, uncompressed configuration to the second, at least partially compressed configuration, the frame at least partially compresses under the weight of the user's head when the head is tilted towards the frame due to a displacement of the head engaging portion towards the shoulder engaging portion,
    wherein the frame is configured to return from the second, at least partially compressed configuration to the first, uncompressed configuration when the user moves the user's head away from the frame,
    wherein the head engaging portion comprises a first limb and a second limb connected by a head engaging portion connection member, and wherein the shoulder engaging portion comprises a first shoulder engaging portion limb and a second shoulder engaging portion limb, the first and second shoulder engaging portion limbs extending from a shoulder engaging portion connecting member, which is connected to the head engaging portion connection member.

2. The support structure of claim 1, wherein the frame is substantially constant thickness.

3. The support structure of claim 1, wherein the frame has a first surface and a second surface.

4. The support structure of claim 3, wherein the first surface is substantially convex.

5. The support structure of claim 3, wherein the second surface is substantially concave.

6. The support structure of claim 1, wherein the first shoulder engaging portion limb and the second shoulder engaging portion limb are adapted to straddle a user's shoulder.

7. The support structure of claim 3, wherein the head engaging portion and the shoulder engaging portion define the first surface.

8. The support structure of claim 3, wherein first surface and the second surface are substantially parallel.

9. The support structure of claim 1, wherein the frame defines a continuous surface.

10. The support structure of claim 1, wherein the frame is resilient.

11. The support structure of claim 1, wherein the frame is a flexible sheet.

12. The support structure of claim 1, further comprising a shoulder engaging portion bridging means connecting an end of the first shoulder engaging portion limb to an end of the second shoulder engaging portion limb, the first and second shoulder engaging portion limb ends being distal from the head engaging portion.

13. The support structure of claim 12, wherein the shoulder engaging portion bridging means extends over the shoulder, in use, to distribute the weight of the user's head over a greater area than the contact area defined only by the first and second limbs, wherein the greater area includes the contact area of the first limb, the contact area of the second limb with the shoulder and the contact area defined by the shoulder engaging bridging means with the shoulder which contact area being between the first limb and the second limb.

14. The support structure of claim 1, wherein the support structure comprises an anchoring means adapted to secure the support structure, in use, to a user.

15. The support structure of claim 14, wherein the anchoring means is adapted to secure the support structure, in use, to a user's neck.

16. The support structure of claim 15, wherein the anchoring means is adapted to press the support structure against a user's neck.

17. The support structure of claim 1, wherein the cover defines a receiving portion.

18. The support structure of claim 17, wherein the receiving portion is a pocket.

19. The support structure of claim 14, wherein the anchoring means comprises a fabric material.

20. The support structure of claim 19, wherein the anchoring means comprises an elongate length of fabric material.

21. The support structure of claim 20, wherein the fabric material is a scarf that forms the cover.

22. The support structure of claim 17, wherein the receiving portion is located at a first end of the cover.

23. The support structure of claim 1, wherein member, the head and shoulder engaging portion connecting members may engage as the frame compresses.

24. The support structure of claim 23, wherein upon engagement of the head and shoulder engaging portion connecting members, the head and shoulder engaging portion connecting members resist further compression of the frame.

25. A travel support structure for at least partially supporting a user's head, the support structure comprising:
    a frame sized to fit within a cover, the frame including:
        a head engaging portion that includes a plurality of head engaging limbs, wherein, when in use, at least one of the plurality of head engaging limbs engages with an underside of the user's jaw and is operable to provide support for tilting of the user's head towards the head engaging portion of the frame, and a shoulder engaging portion that includes a plurality of shoulder engaging limbs connected to the head engaging portion, wherein, when in use, at least one of the shoulder engaging limbs engages with a shoulder area, wherein a portion of the frame that connects the head engaging portion to the shoulder engaging portion is shaped to correspond with a contour of a user's neck such that, when in use, the frame rests against the user's neck and is operable to spread a load of the user's head to the shoulder area, wherein the frame at least partially compresses under the weight of the user's head when the user's head is tilted towards the frame due to a displacement of the head engaging portion towards the shoulder engaging portion, wherein the frame further comprises first and second engagement members configured to, in use, engage with each other during the at least partial compression of the frame under the weight of the user's head, and wherein the contact area between the first and second engagement members increases as the frame is further compressed.

26. A support structure for at least partially supporting a user's head, the support structure comprising:

a resilient frame sized to fit within a cover, the frame including:

a head engaging portion including a first head engaging portion limb and a second head engaging portion limb, and a shoulder engaging portion including a first shoulder engaging portion limb and a second shoulder engaging portion limb, wherein the head engaging portion limbs are connected at one end by a connecting member and wherein the shoulder engaging portion limbs extend from corresponding limbs of the head engaging portion, wherein the head engaging portion limbs are operable, in use, to engage with an underside of the user's jaw and are operable to provide support for tilting of the user's head towards the head engaging portion of the frame, wherein the shoulder engaging portion limbs, in use, are operable to engage with a shoulder area and wherein between the head engaging portion and the shoulder engaging portion the frame is shaped to correspond with the contour of the user's neck such that in use, the frame rests against the user's neck and is operable to spread the load of the user's head to the shoulder area, wherein the frame is movable between a first, uncompressed configuration, and a second, at least partially compressed configuration, wherein when moved from the first, uncompressed configuration to the second, at least partially compressed configuration the frame at least partially compresses under the weight of the user's head when the head is tilted towards the frame due to a displacement of the head engaging portion limbs towards the shoulder engaging portion, wherein the frame is configured to return from the second, at least partially compressed configuration to the first, uncompressed configuration when the user moves their head away from the frame, and wherein the frame further comprises first and second engagement members configured to, in use, engage with each other during the at least partial compression of the frame under the weight of the user's head, and wherein the contact area between the first and second engagement members increases as the frame is further compressed.

* * * * *